R. SCHEEL.
RESILIENT WHEEL.
APPLICATION FILED APR. 29, 1919.
1,391,278.
Patented Sept. 20, 1921.
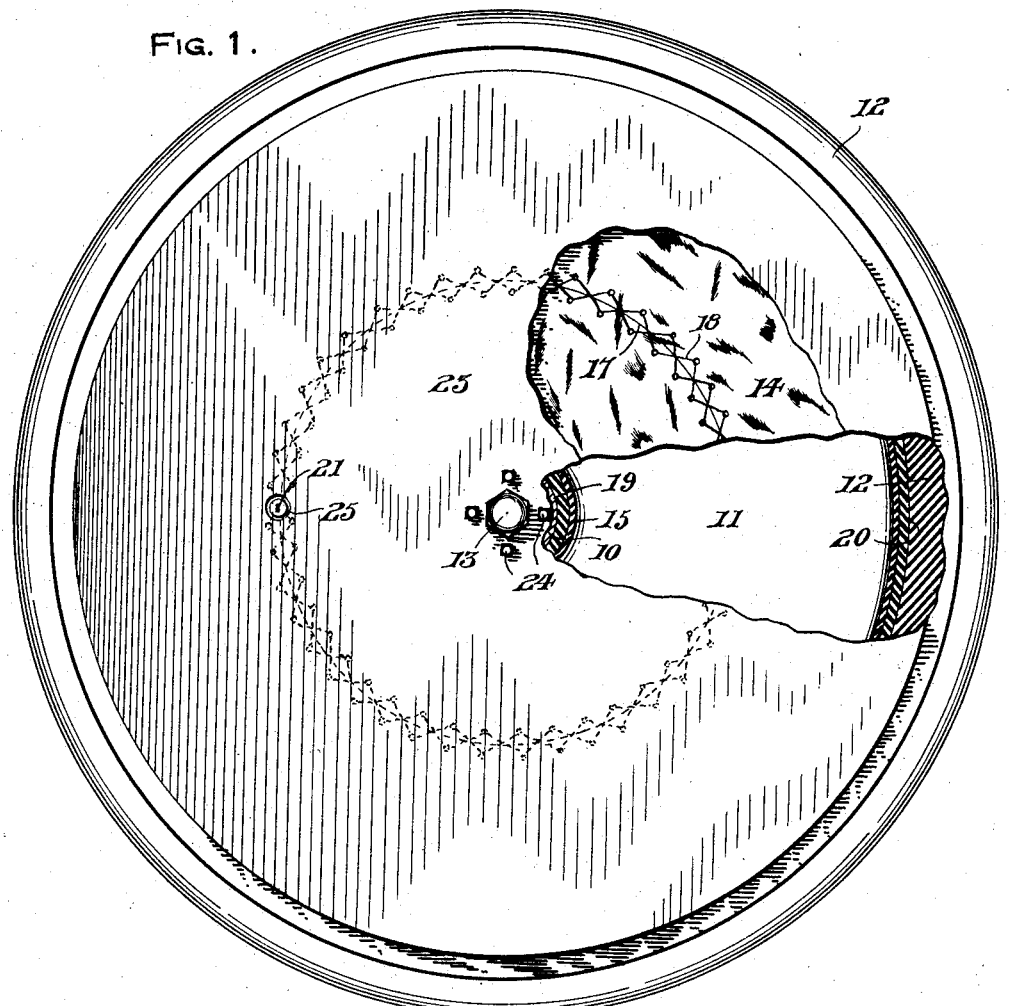
FIG. 1.
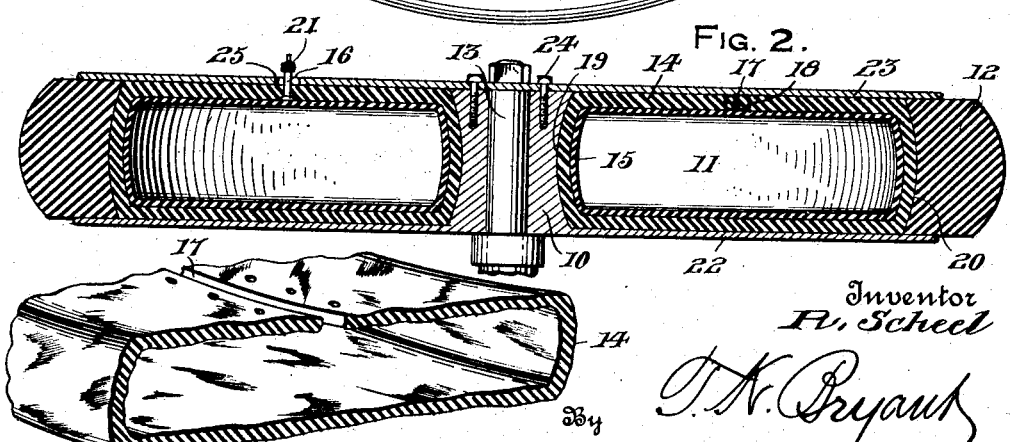
FIG. 2.
FIG. 3.
Inventor
R. Scheel
By T. N. Bryant
Attorney

UNITED STATES PATENT OFFICE.

RUDOLPH SCHEEL, OF DIXON, CALIFORNIA.

RESILIENT WHEEL.

1,391,278.

Specification of Letters Patent. Patented Sept. 20, 1921.

Application filed April 29, 1919. Serial No. 293,380.

*To all whom it may concern:*

Be it known that I, RUDOLPH SCHEEL, a citizen of the United States of America, residing at Dixon, in the county of Solano and State of California, have invented certain new and useful Improvements in Resilient Wheels, of which the following is a specification.

The primary object of the invention is the provision of a vehicle wheel having all the cushioning properties of a pneumatic tire and capable of enduring long usage without reducing its efficiency, which is easy and cheap to manufacture.

A further object of the invention is to provide a vehicle wheel having a pneumatic supporting means out of contact with the road-bed whereby life of the wheel is greatly increased, the wheel being adapted for either traction driving wheels or for purposes of steering as well as carrying the load in a cushioned manner.

With these general objects in view and others that will appear as the nature of the invention is better understood, the same consists in the novel combination, construction, and arrangement of parts hereinafter more fully described, illustrated in the accompanying drawings, and pointed out in the appended claim.

In the drawings forming a part of this application and in which like designating characters refer to corresponding parts throughout the several views.

Figure 1 is an elevational view of the outer side of my form of wheel partly broken away, Fig. 2 is a diametrical sectional view thereof, and Fig. 3 is a perspective view of a portion of the pneumatic shoe or casing employed with the wheel.

Referring more in detail to the drawings, my wheel broadly comprises a hub 10 having a pneumatic cushion 11 mounted thereon while a tread member 12 is carried by the periphery of the cushion and whereby the load of the axle 13 upon which said hub is mounted, is resiliently supported against shocks and jars incident to travel.

The pneumatic member 11 may be of any desired form and is herein illustrated consisting of an outer casing or shoe 14 formed of rubber, although fabric or leather might be employed if desired. An inner tube 15 is received within the shoe 14 with an inflating nipple 16 projecting from one side of the tube through a side slot 17 in the shoe 14 normally closed in any suitable manner as by the lacings 18.

The hub 10 preferably has a curved perimeter 19 to accommodate the shoe 14 in seated position thereon while the tread 12 which is of annular form and may be solid rubber or other material has a concaved inner face 20 seating upon the outer periphery of the pneumatic cushion 11. It will be seen that the pneumatic cushion 11 may be readily mounted upon the hub 10 in any manner similar to the mounting of a pneumatic tire upon a rim and the tread 12 being thereafter positioned around the pneumatic cushion 11, the cushion tube 15 is inflated with air through the nipple 16 which tensions the cushion 11 between the hub 10 and tread 12. A screw-cap 21 is provided for the nipple 16 it being understood that the opening 17 and nipple 16 are provided at the outer side of the wheel when the same is positioned for use upon an axle such as 13.

Side plates 22 and 23 are provided for the inner and outer sides respectively of the wheel for furnishing rigidity thereto and maintaining the cushion 11 and tread 12 in position forming the wheel so that the wheel may withstand torsional strains during travel and especially when rounding a curve.

One manner of mounting the plates 22 and 23 is herein illustrated, the plate 22 being formed integral with the hub 10 for purposes of strength while the outer plate 23 is detachably secured to the end of the hub by means of screws 24. A perforation 25 in the outer plate 23 accommodates the nipple 16 so that the pneumatic cushion 11 may be inflated or deflated at will without removing the outer plate 23.

The complete operation of the invention will be fully understood from this detailed description thereof, the normal position of the relative parts being herein illustrated with the inner tube 15 inflated and the pneumatic cushion 11 mounted upon the hub 10 with the tread 12 carried by the outer periphery of the cushion and the side plates 22 and 23 retaining the members operatively assembled. The pneumatic member 11 cushions the tread 12 for supporting the load imparted to the wheel by the axle 13 when the tread 12 is upon the ground. My wheel may be employed as a driver or traction wheel or for any of the useful purposes of any kind of wheel desired, the same possessing all of the properties usually imparted by a pneumatic tire but possessing longer life by reason of the separation of the pneumatic member from the road-bed which is only contacted by the tread member 12. The tread 12 may be renewed when desired and it will be understood that while one form of my invention is herein illustrated, and described, changes may be made in form, proportion and details of construction without in any manner departing from the spirit and scope of my invention as claimed.

What I claim as new is:

A resilient wheel comprising a hub, a separable tread member spaced from said hub, positioning plates at the ends of said hub and between which said tread member is received, a casing in the space between said hub and tread member having a side slot therein provided with closing means, and a pneumatic tube received within said casing.

In testimony whereof I affix my signature.

RUDOLPH SCHEEL.